(12) United States Patent
Gilhotra et al.

(10) Patent No.: US 10,582,138 B2
(45) Date of Patent: Mar. 3, 2020

(54) IMAGE SENSORS WITH DUAL CONVERSION GAIN PIXELS AND ANTI-ECLIPSE CIRCUITRY

(71) Applicant: SEMICONDUCTOR COMPONENTS INDUSTRIES, LLC, Phoenix, AZ (US)

(72) Inventors: Pawan Gilhotra, Newark, CA (US); Nirav Dharia, Milpitas, CA (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 91 days.

(21) Appl. No.: 15/713,244

(22) Filed: Sep. 22, 2017

(65) Prior Publication Data

US 2019/0098235 A1    Mar. 28, 2019

(51) Int. Cl.
*H04N 5/359*    (2011.01)
*H04N 5/3745*    (2011.01)
*H04N 5/243*    (2006.01)
*H04N 5/378*    (2011.01)

(52) U.S. Cl.
CPC .......... *H04N 5/3598* (2013.01); *H04N 5/243* (2013.01); *H04N 5/378* (2013.01); *H04N 5/3745* (2013.01)

(58) Field of Classification Search
CPC ........ H04N 5/357; H04N 5/359; H04N 5/363; H04N 5/365; H04N 5/3651; H04N 5/3653; H04N 5/3655; H04N 5/3658; H04N 5/243; H04N 5/378; H04N 5/355; H04N 5/35563; H04N 5/374; H04N 5/3745; H04N 5/3559; H04N 5/3598
See application file for complete search history.

(56) References Cited

U.S. PATENT DOCUMENTS

| | | | |
|---|---|---|---|
| 7,750,836 B2* | 7/2010 | Muramatsu | H03M 1/1023 341/164 |
| 2004/0251394 A1* | 12/2004 | Rhodes | H01L 27/14603 250/208.1 |
| 2006/0238634 A1 | 10/2006 | Yan | |
| 2006/0256220 A1* | 11/2006 | Rysinski | H04N 5/3598 348/308 |
| 2006/0278809 A1 | 12/2006 | Takayanagi | |
| 2007/0091193 A1* | 4/2007 | Phan | H04N 5/3598 348/311 |

(Continued)

OTHER PUBLICATIONS

Dharia, U.S. Appl. No. 15/392,384, filed Dec. 28, 2016.

*Primary Examiner* — Albert H Cutler
(74) *Attorney, Agent, or Firm* — Treyz Law Group, P.C.; Jason Tsai

(57) ABSTRACT

An image sensor may include an array of dual conversion gain image pixels arranged in rows and columns. The image pixels arranged along the same column may be coupled to a column line. The column line may be coupled to anti-eclipse control circuitry. In one suitable arrangement, the anti-eclipse control circuitry may include a comparator that compares the output signal on the column line to an anti-eclipse bias voltage. If, during a reset sampling period, the output signal on the column line is less than the anti-eclipse bias voltage, a current source may be used to charge the bottom plate of a dual conversion gate capacitor in the selected image pixel to help restore the voltage of the floating diffusion node in the selected pixel.

20 Claims, 6 Drawing Sheets

(56) References Cited

U.S. PATENT DOCUMENTS

| | | | |
|---|---|---|---|
| 2009/0009635 A1* | 1/2009 | Maeda | H04N 5/351 348/241 |
| 2009/0295967 A1* | 12/2009 | Gomi | H04N 5/3598 348/308 |
| 2012/0008032 A1* | 1/2012 | Kurihara | H04N 5/3598 348/308 |
| 2012/0188427 A1* | 7/2012 | Solhusvik | H04N 5/3559 348/300 |
| 2012/0249851 A1 | 10/2012 | Martinussen | |
| 2012/0273651 A1* | 11/2012 | Willassen | H01L 27/14641 250/208.1 |
| 2015/0237275 A1* | 8/2015 | Iwata | H04N 5/3598 348/241 |
| 2016/0065868 A1 | 3/2016 | Olsen | |

* cited by examiner

IMAGE SENSORS WITH DUAL CONVERSION GAIN PIXELS AND ANTI-ECLIPSE CIRCUITRY

BACKGROUND

This relates generally to imaging systems and, more particularly, to imaging systems having circuitry for handling the eclipse phenomenon.

Image sensors are commonly used in electronic devices such as cellular telephones, cameras, and computers to capture images. In a typical arrangement, an electronic device is provided with an array of image pixels arranged in pixel rows and pixel columns. Each image pixel in the array includes a photodiode that is coupled to a floating diffusion region via a transfer gate. Column circuitry is coupled to each pixel column for reading out pixel signals from the image pixels. The column circuitry often implements a correlated double sampling (CDS) process, which involves obtaining pixel signals by computing the difference between reset signals sampled during reset operations and image signals sampled following charge transfer operations.

The eclipse phenomenon occurs when at least some pixels are exposed to strong light such as direct illumination from the sun. The strong light may cause the floating diffusion to leak, which results in an erroneous reset signal being sampled (i.e., reset signals sampled during reset operations may exhibit voltage levels that are less than the desired reset level). Consequently, the pixel signal computed via CDS becomes a smaller value, the effect of which is manifested when an over-illuminated pixel appears dark when it should be bright.

It is within this context that the embodiments herein arise.

DETAILED DESCRIPTION

Figure 1:
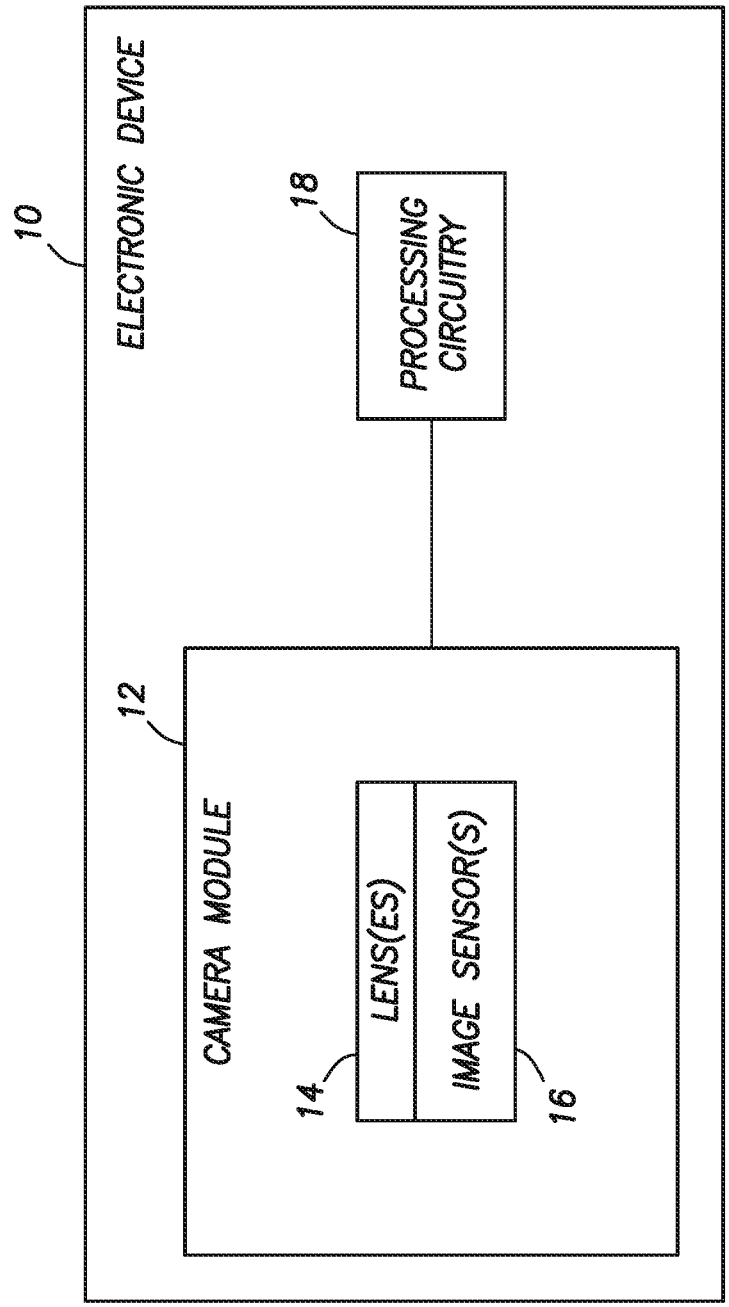
FIG. 1 is a schematic diagram of an illustrative electronic device that includes an image sensor in accordance with an embodiment.

The present embodiments relate to image sensors with pixels that are coupled to anti-eclipse circuitry. An illustrative electronic device that may include pixels with anti-eclipse circuitry is shown in FIG. 1. Electronic device 10 may be a digital camera, a computer, a cellular telephone, a medical device, or other electronic device. Camera module 12 (sometimes referred to as an imaging device) may include image sensor 16 and one or more lenses 14. During operation, lenses 14 focus light onto image sensor 16. Image sensor 16 includes photosensitive elements (e.g., pixels) that convert the light into digital data. Image sensors may have any number of pixels (e.g., hundreds, thousands, millions, or more). A typical image sensor may, for example, have millions of pixels (e.g., megapixels). As examples, image sensor 16 may include bias circuitry (e.g., source follower load circuits), sample and hold circuitry, correlated double sampling (CDS) circuitry, amplifier circuitry, analog-to-digital (ADC) converter circuitry, data output circuitry, memory (e.g., buffer circuitry), address circuitry, etc.

Still and video image data from image sensor 16 may be provided to processing circuitry 18. Processing circuitry 18 may be used to perform image processing functions such as automatic focusing functions, depth sensing, data formatting, adjusting white balance and exposure, implementing video image stabilization, face detection, etc.

Processing circuitry 18 may also be used to compress raw camera image files if desired (e.g., to Joint Photographic Experts Group or JPEG format). In a typical arrangement, which is sometimes referred to as a system on chip (SOC) arrangement, image sensor 16 and processing circuitry 18 are implemented on a common integrated circuit. The use of a single integrated circuit to implement image sensor 16 and processing circuitry 18 can help to reduce costs. This is, however, merely illustrative. If desired, image sensor 16 and processing circuitry 18 may be implemented using separate integrated circuits. Processing circuitry 18 may include microprocessors, microcontrollers, digital signal processors, application specific integrated circuits, or other processing circuits.

Figure 2:
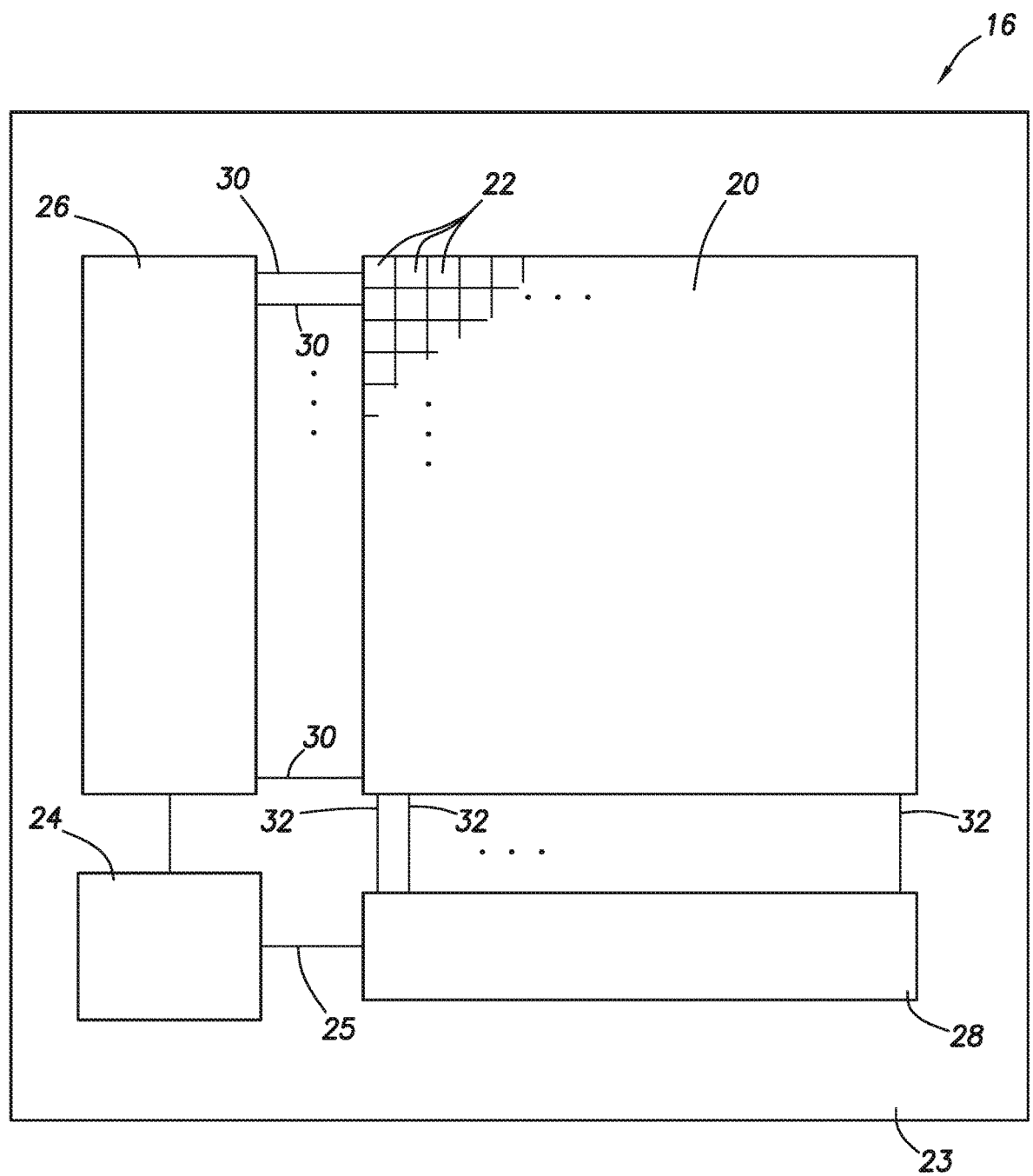
FIG. 2 is a diagram of an illustrative pixel array and associated readout circuitry for reading out image signals from the pixel array in accordance with an embodiment.

As shown in FIG. 2, image sensor 16 may include pixel array 20 containing image sensor pixels 22 arranged in rows and columns (sometimes referred to herein as image pixels or pixels) and may also include control and processing circuitry 24 (e.g., image signal processing circuitry). Array 20 may contain, for example, hundreds or thousands of rows and columns of image sensor pixels 22. Control circuitry 24 may be coupled to row control circuitry 26 (sometimes referred to as row addressing or row decoder circuitry) and image readout circuitry 28 (sometimes referred to as column control circuitry, readout circuitry, processing circuitry, column decoder circuitry, or data converter circuitry). Pixel array 20, control and processing circuitry 24, row control circuitry 26, and image readout circuitry 28 may be formed on a semiconductor substrate 23. If desired, some or all of the components of image sensor 16 may instead be formed on substrates other than substrate 23, which may be connected to substrate 23, for instance, through wire bonding or flip-chip bonding.

Row control circuitry 26 may receive row addresses from control circuitry 24 and supply corresponding row control signals such as reset, row-select, charge transfer, dual conversion gain, and/or readout control signals to pixels 22 over row control paths 30. One or more conductive lines such as column lines 32 may be coupled to each column of pixels 22 in array 20. Column lines 32 may be used for reading out image signals from pixels 22 and for supplying bias signals (e.g., bias currents or bias voltages) to pixels 22. If desired, during pixel readout operations, a pixel row in array 20 may be selected using row control circuitry 26 and image signals generated by image pixels 22 in that pixel row can be read out along column lines 32.

Image readout circuitry 28 may receive image signals (e.g., analog pixel values generated by pixels 22) over column lines 32. Image readout circuitry 28 may include sample-and-hold circuitry for sampling and temporarily storing image signals read out from array 20, amplifier circuitry, analog-to-digital conversion (ADC) circuitry, bias circuitry, column memory, latch circuitry for selectively enabling or disabling the column circuitry, or other circuitry that is coupled to one or more columns of pixels in array 20 for operating pixels 22 and for reading out image signals from pixels 22. ADC circuitry in readout circuitry 28 may convert analog pixel values received from array 20 into corresponding digital pixel values (sometimes referred to as digital image data or digital pixel data). Image readout circuitry 28 may supply digital pixel data to control and processing circuitry 24 and/or processor 18 (FIG. 1) over path 25 for pixels in one or more pixel columns.

Figure 3:
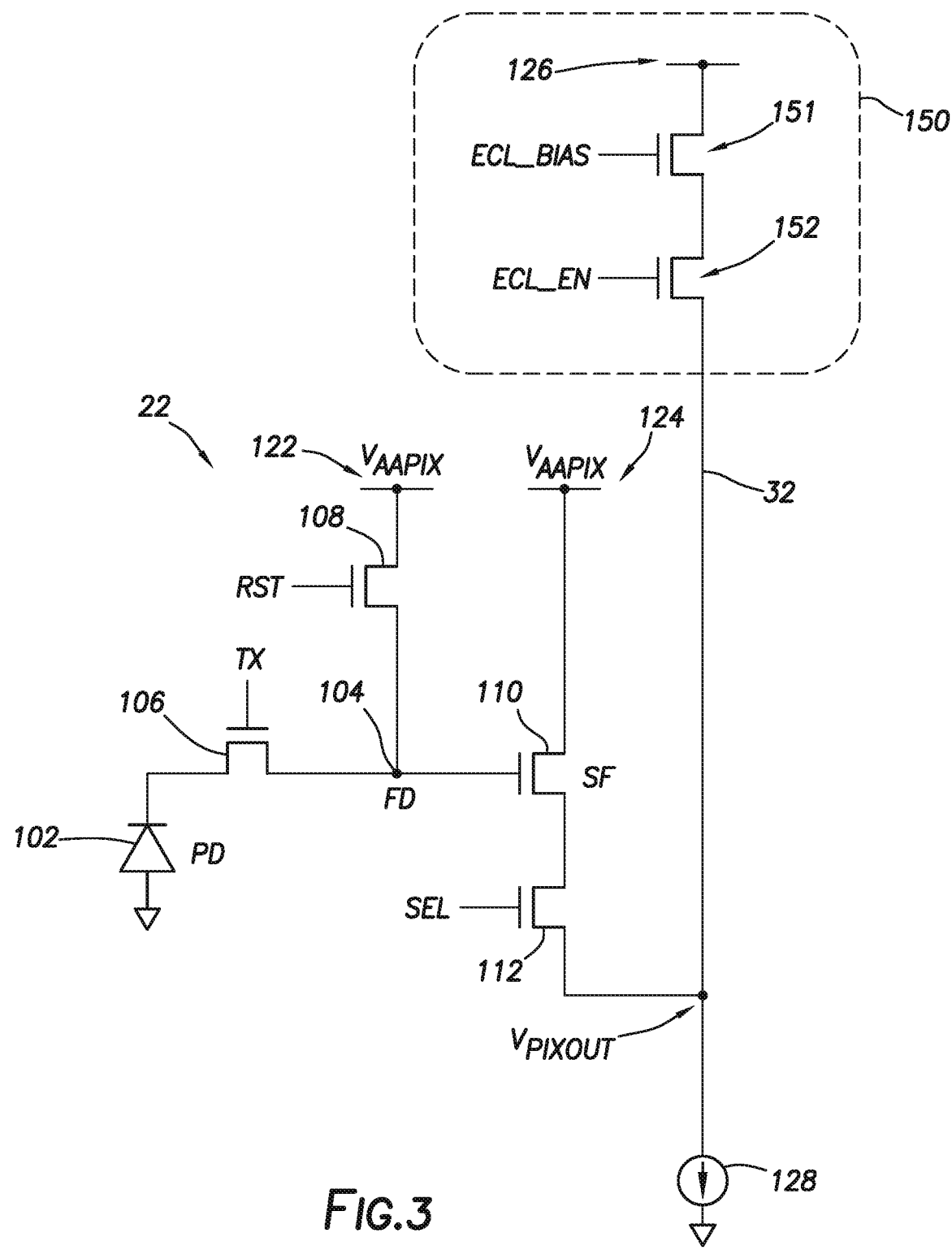
FIG. 3 is a circuit diagram of an image pixel that is coupled to an anti-eclipse pull-up circuit.

FIG. 3 shows a diagram of an image pixel 22 that is coupled to anti-eclipse circuit 150. Pixel 22 includes a photodiode 102 (PD), a charge transfer gate 106, a floating diffusion node 104 (FD), a reset transistor 108, a source follower transistor 110 (SF), and a row select transistor 112. Photodiode 102 is coupled to floating diffusion node 104 via charge transfer transistor 106. Control signal TX can be driven high to allow charge accumulated in photodiode 102 to be transferred to node 104. Reset transistor 108 is connected between power supply terminal 122 and floating diffusion node 104. Power supply terminal 122 may be coupled to any desired bias voltage $V_{AAPIX}$ (e.g., 1.8 V, 2.8 V, between 1.5 V and 3.5 V, between 1 V and 6 V, greater than 1 V, less than 10 V, etc.). Reset transistor 108 may be turned on by driving reset signal RST high to drive node 104 to the $V_{AAPIX}$ reset level. Source follower transistor 110 and row select transistor 112 are coupled in series between power supply terminal 124 and column output line 32. Power supply terminal 124 may be coupled to any desired bias voltage $V_{AAPIX}$ (e.g., 1.8 V, 2.8 V, between 1.5 V and 3.5 V, between 1 V and 6 V, greater than 1 V, less than 10 V, etc.). Column output line 32 may be coupled to a current source such as current source 128. Transistor 110 may have a gate that is connected to node 104, whereas transistor 112 may have a gate that is controlled by row select signal SEL.

Signal SEL can be driven high to so that signals can be read out from pixel 22 onto the column output line. Voltage Vpixout on the column output line may represent the pixel signal at any given point in time during readout operations. As shown in FIG. 3, circuit 150 is connected to column output line 32. In particular, circuit 150 includes pull-up transistors 151 and 152 connected in series between power supply terminal 126 and column output line 32. Power supply terminal 126 may be coupled to any desired bias voltage $V_{AAPIX}$ (e.g., 1.8 V, 2.8 V, between 1.5 V and 3.5 V, between 1 V and 6 V, greater than 1 V, less than 10 V, etc.). Transistor 151 may have a gate terminal that receives an anti-eclipse bias voltage (ECL_BIAS). The anti-eclipse bias voltage may be any desired voltage (e.g., 1.7 V, 2.7 V, between 1.5 V and 3.5 V, between 1 V and 6 V, greater than 1 V, less than 10 V, etc.). Transistor 152 may have a gate terminal that receives an anti-eclipse control pulse ECL_EN. Circuit 150 may help mitigate the negative effects of eclipse conditions on pixel data.

In eclipse conditions, excess charge in floating diffusion region 104 may result in a drop of voltage at floating diffusion region 104. Because Vpixout is proportional to the voltage at the floating diffusion region, the eclipse conditions cause a voltage drop for Vpixout as well. Therefore, when the reset charge level is sampled, the reset charge level appears low. This causes the correlated double sampling readout from the photodiode to be inaccurate. Anti-eclipse circuit 150 helps this problem by clamping Vpixout to a given voltage during the reset sampling period. In FIG. 3, ECL_BIAS may be any desired voltage (e.g., 1.7 V, 2.7 V, between 1.5 V and 3.5 V, between 1 V and 6 V, greater than 1 V, less than 10 V, etc.). Anti-eclipse circuit 150 in FIG. 3 therefore ensures that the sampled reset charge level will have a minimum value (e.g., 1.7 V or another desired minimum value). Even if the floating diffusion region drops to a low value, Vpixout will remain at the minimum value due to anti-eclipse circuit 150.

Ideally, anti-eclipse circuit 150 should not interfere with Vpixout in non-eclipse conditions. Due to variation in Vpixout reset potential (which can be caused by variations in the threshold voltage of the source follower transistor, the threshold voltage of transistor 151, or some other non-linear effects), anti-eclipse circuit 150 may still get triggered. In such scenarios, voltage Vpixout will have two contending reset potentials—one from anti-eclipse circuit 150 and another from source follower transistor 110. The anti-eclipse potential may override the source follower. Thus, the reset noise is sampled from anti-eclipse circuit 150 while the signal noise is sampled only from the pixel. The two noises are not correlated and cannot be canceled. This may occur in one column but not another due to variations among transistors 151 and 152 in circuit 150 of each individual column. As a result, the arrangement of FIG. 3 may produce an undesirable column fixed pattern noise (cFPN).

Figure 4:
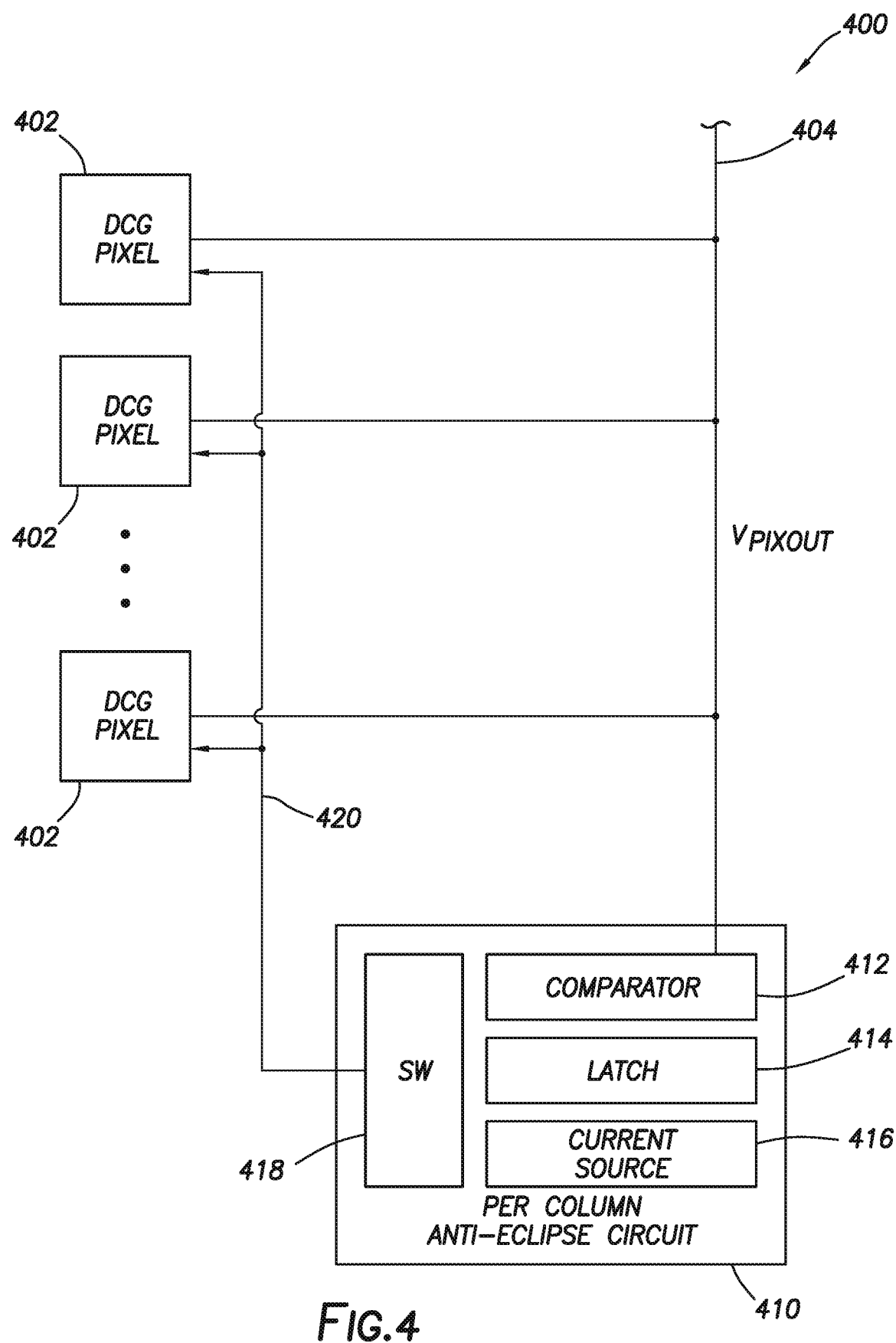
FIG. 4 is a circuit diagram of an illustrative anti-eclipse circuit that is coupled to a column of dual conversion gain image sensor pixels in accordance with an embodiment.

In accordance with an embodiment, image sensor circuitry 400 may include pixels 402 coupled to a column-wise anti-eclipse circuit 410 that is configured to mitigate column fixed pattern noise (see, e.g., FIG. 4). As shown in FIG. 4, image sensor pixels 402 may be dual conversion gain (DCG) pixels that are operable in a first mode (e.g., a low gain mode) and a second mode (e.g., a high gain mode). Each DCG pixel 402 may include a dual conversion gain capacitor that is selectively switched in and out of use to place that pixel in one of the first and second modes. Pixels 402 arranged along the same column may be coupled to a corresponding column readout line 404 on which voltage Vpixout is provided.

Per column anti-eclipse circuit 410 may include comparator 412, latch 414, current source 416, and switching circuitry 418. Comparator 412 may be a voltage comparator that receives voltage Vpixout and compares Vpixout to a reference voltage. Both comparator 412 and latch 414 may control switching circuitry 418 depending on the current voltage level of Vpixout. Switching circuitry 418 may selectively allow current source 416 to charge the DCG capacitor in the selected pixel 402 using path 420.

Figure 5:
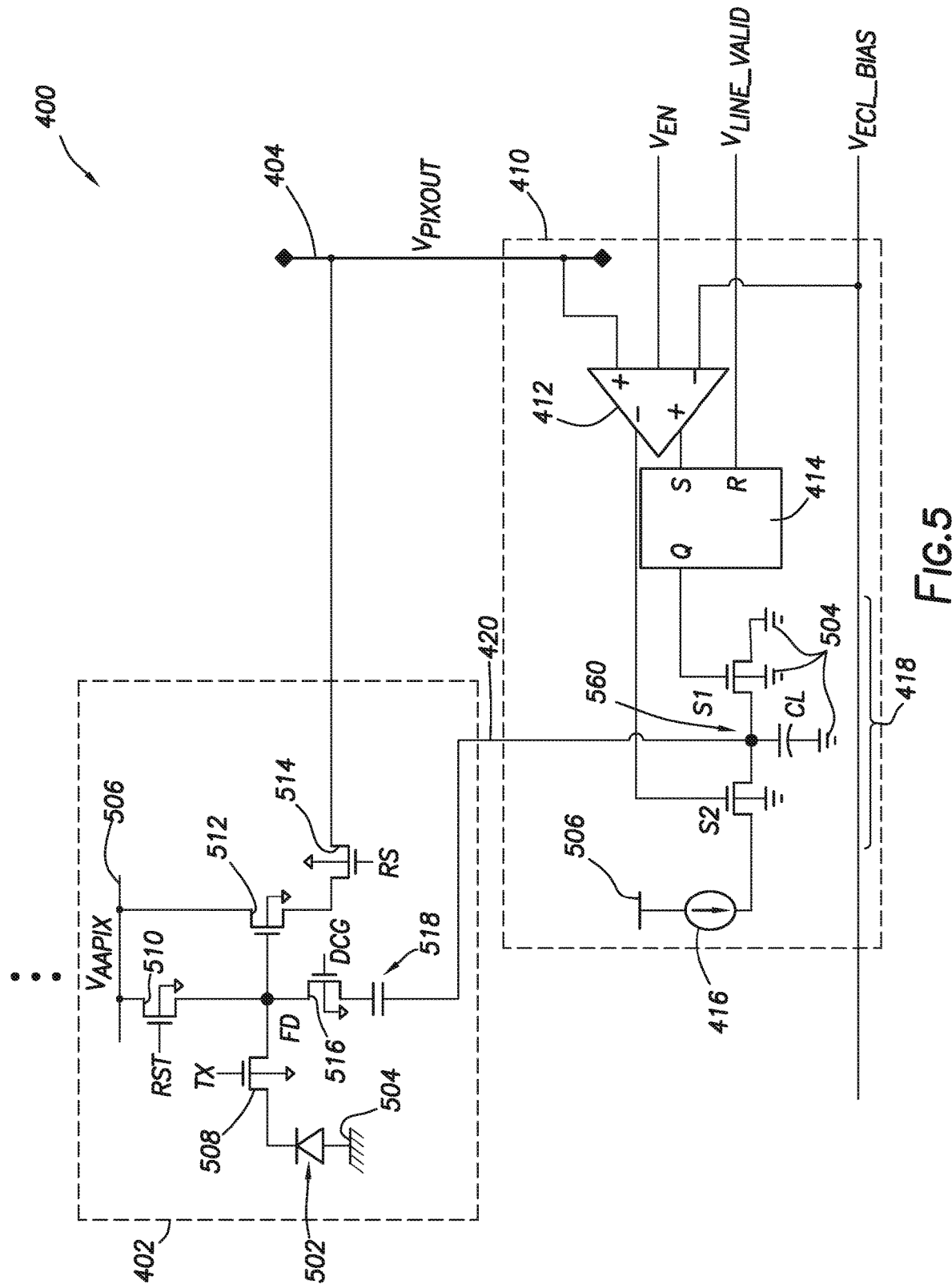
FIG. 5 is a circuit diagram showing one suitable implementation of the anti-eclipse circuit of FIG. 4 in accordance with an embodiment.

FIG. 5 is a circuit diagram showing one suitable implementation of anti-eclipse circuit 410. As shown in FIG. 5, pixel 402 may include a photosensitive element such as photodiode 502, a charge transfer transistor such as charge transfer gate 508, a floating diffusion node (or region) FD, a reset transistor 510, a source follower transistor 512, a row select transistor 514, a DCG capacitor 518, and a DCG switching transistor 516.

Photodiode 502 may be coupled to floating diffusion node FD via charge transfer transistor 508. Control signal TX can be asserted to allow charge accumulated in photodiode 502 to be transferred to node FD. Reset transistor 510 may be coupled between power supply line 506 and floating diffusion node FD. Power supply line 506 may be biased to any desired power supply voltage $V_{AAPIX}$ (e.g., 1.8 V, 2.8 V, between 1.5 V and 3.5 V, between 1 V and 6 V, greater than 1 V, less than 10 V, etc.). Reset transistor 510 may be turned on by asserting reset signal RST to drive node FD to the $V_{AAPIX}$ reset level.

Source follower transistor 512 and row select transistor 514 are coupled in series between power supply terminal 506 and column output line 404. Source follower transistor 512 may have a gate that is connected to node FD, whereas row select transistor 514 may have a gate that is controlled by row select signal RS. Signal RS can be asserted so that signals can be read out from pixel 402 onto column output line 404. Voltage Vpixout on column output line 404 may represent the pixel signal at any given point in time during readout operations.

Transistor 516 and capacitor 518 may be coupled in series between node FD and control line 420, which is coupled to per column anti-eclipse circuit 410. Capacitor 518 may be directly coupled to circuit 410. If transistor 516 is turned on, capacitor 518 may load floating diffusion node FD (e.g., capacitor 518 may affect the voltage of node FD via charge sharing, may lower the gain of pixel 402, etc.). If transistor 516 is turned off, capacitor 518 is decoupled from floating diffusion node FD.

Still referring to FIG. 5, anti-eclipse circuit 410 may include comparator 412 (e.g., a differential comparator circuit), latch 414 (e.g., a set-reset latch), current source 416, and switching circuitry 418 (e.g., switching transistors S1 and S2 coupled to load capacitor CL). Comparator 412 may have a first (+) input that receives Vpixout from column line 404, a second (−) input that receives a reference eclipse bias voltage Vecl_bias, a first (+) output that is coupled to latch 414, and a second (−) that is coupled to the gate terminal of switch S2. Comparator 412 may be enabled by signal Ven (e.g., comparator may be activated if Ven is high or may be deactivated when Ven is low).

Latch 414 may have a set (S) input that is coupled to the first (+) output of comparator 412, a reset (S) input that receives a line valid voltage Vline_valid, and an output (Q) that is coupled to the gate terminal of switch S1. If the reset input is high, then output Q is driven low. If the set input is high, then output Q is driven high. Otherwise, latch 414 should hold its value. The set and reset inputs should not be high simultaneously.

Switch S1 is coupled between node 560 and ground power supply line 504 (e.g., a ground line on which a ground power supply voltage is provided). Capacitor CL is coupled between node 560 and ground 504. Switch S2 is coupled between current source 416 and node 560. Node 560 may be coupled to the bottom plate of capacitor 518 in each pixel 402 arranged along that particular column via path 420.

During normal operation (e.g., when Vpixout is greater than Vecl_bias), the bottom plate of DCG capacitor 518 is at ground since switch S2 is typically off, and switch S1 is on. Under eclipse condition, however, the bright light will cause node FD to droop, which may then cause Vpixout to dip below Vecl_bias. When Vpixout is less than Vecl_bias, comparator 412 trips and turns on switch S2 while turning off switch S1. Only one of switches S1 and S2 should be turned on at any given point in time. When switch S2 is turned on, current source 416 charges node 560, which charges the bottom plate of DCG capacitor 518 linearly. Doing so will directly increase the voltage of floating diffusion node FD, thus restoring Vpixout to its desired level.

Switch S1 will remain off and may be turned on as soon as Vline_valid is asserted, which occurs when operations move on to the next row or can be triggered by some other intermediate signal, which will then restore the bottom place of capacitor 518 back to ground. By directly applying the anti-eclipse compensation to the floating diffusion node FD in this way rather than simply charging the column output line, any noise introduced by circuit 410 can be cancelled by the correlated double sampling (CDS) procedure, and thus cFPN is eliminated. If desired, other ways of directly charging the floating diffusion node with an anti-eclipse circuit may be implemented. Moreover, no extra structures are required for the dual conversion gain pixel design.

Figure 6:
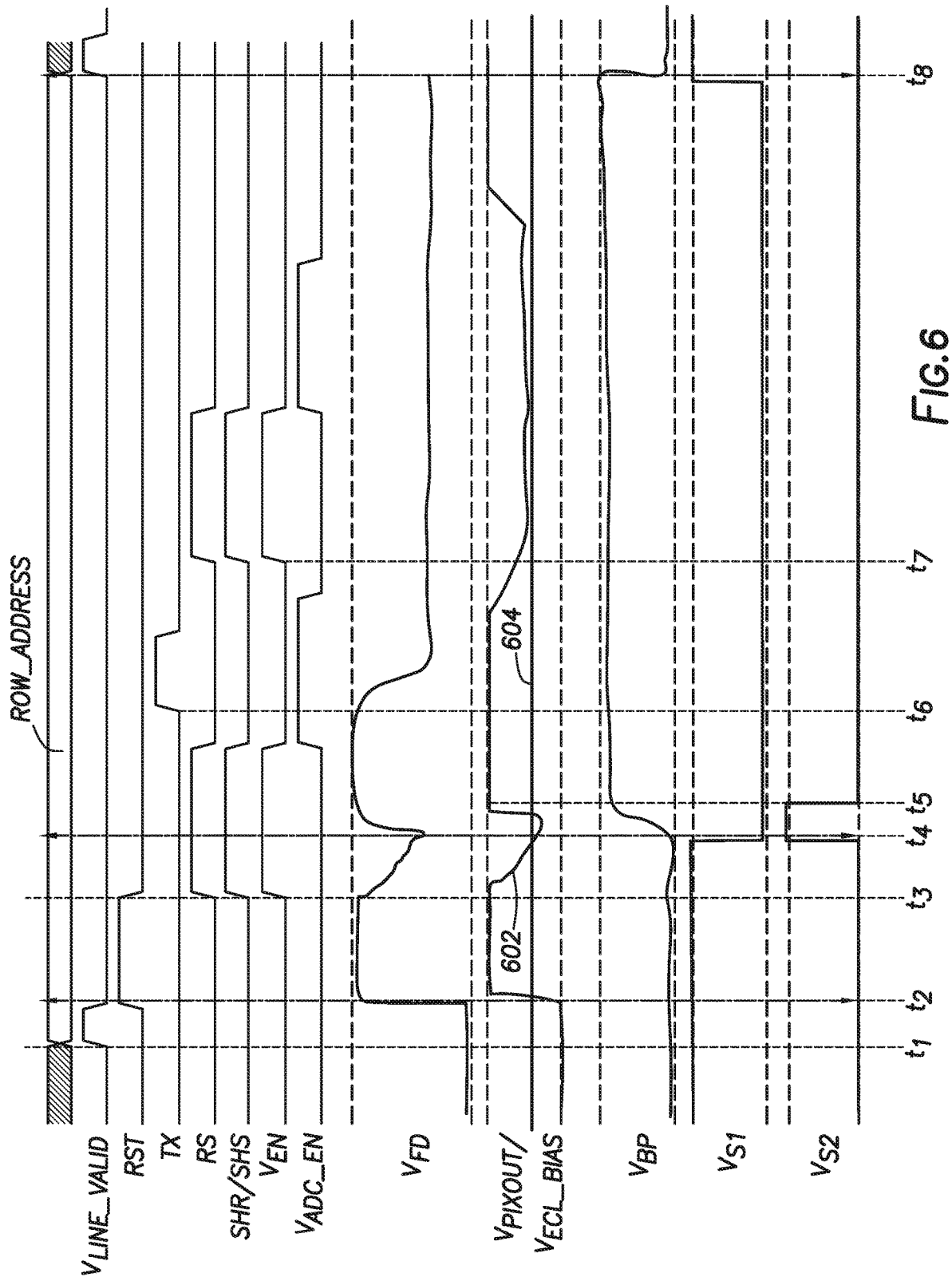
FIG. 6 is a timing diagram illustrating the operation of an anti-eclipse circuit of the type shown in FIG. 5 in accordance with an embodiment.

FIG. 6 is a timing diagram illustrating the operation of anti-eclipse circuit 410 when accessing a given row. At time t1, signal Vline_valid may be pulsed high to reset latch 414. At time t2, signal RST may be asserted to charge the floating diffusion voltage Vfd high to the reset level. When Vfd is charged up, Vpixout (line 602) will follow suit.

At time t3, signal RST is deasserted, and signals RS, sample-hold-reset control signal SHR, and enable signal Ven are asserted to obtain the sampled reset level. As a result, Vfd may start to droop, and waveform 602 will creep down as well. When Vpixout falls below Vecl_bias (as indicated by voltage level 604) at time t4, voltage Vs1 at the gate of switch S1 will go low, whereas voltage Vs2 at the gate of switch S2 will pulse high temporarily. When switch S2 is on, current source 416 will begin charge the bottom plate of the corresponding DCG capacitor, which will cause Vfd to start increasing. When Vfd starts ramping back up, Vpixout will begin charging up as well. As soon as Vpixout exceeds Vecl_bias (at time t5), comparator 412 trips again, so that Vs2 goes low. Signal Vadc_en, which enables an analog-to-digital converter in the column readout circuitry (FIG. 2), may then be asserted to convert the sampled reset level to a digital equivalent.

At time t6, signal TX is pulsed high to transfer the accumulated charge. At time t7, signals RS, sample-hold-signal control signal SHS, and enable signal Ven are asserted to obtain the sampled signal level. Signal Vadc_en may again then be asserted to convert the sampled signal level to a digital equivalent. The sampled signal level may be subtracted from the sampled reset level (via CDS) to obtain the final pixel output without any cFPN noise. At time t8, signal Vline_valid may be asserted to signify the start of the next row.

These steps are merely illustrative and are not intended to limit the present embodiments. The existing steps may be modified or omitted; some of the steps may be performed in parallel; additional steps may be added; and the order of certain steps may be reversed or altered.

The foregoing is merely illustrative of the principles of this invention and various modifications can be made by those skilled in the art without departing from the scope and spirit of the invention.

What is claimed is:

1. An image sensor, comprising:
   an image pixel having a floating diffusion node;
   a column output line coupled to the image pixel; and
   an anti-eclipse circuit coupled to the column output line, wherein the anti-eclipse circuit comprises a comparator and a latch, and wherein the anti-eclipse circuit is configured to charge the floating diffusion node during eclipse conditions.

2. The image sensor of claim 1, wherein the image pixel is a dual conversion gain image pixel comprising a dual conversion gain capacitor.

3. The image sensor of claim 2, wherein the dual conversion gain capacitor is directly coupled to the anti-eclipse circuit.

4. The image sensor of claim 2, wherein the comparator has first and second different outputs.

5. The image sensor of claim 4, wherein the anti-eclipse circuit further comprises a current source configured to selectively charge the dual conversion gain capacitor.

6. The image sensor of claim 5, wherein the anti-eclipse circuit further comprises a first switch having a gate terminal coupled to the latch.

7. The image sensor of claim 6, wherein the anti-eclipse circuit further comprises a second switch having a gate terminal coupled to the second output of the comparator, and wherein the second switch is coupled in series with the current source and the first switch.

8. The image sensor of claim 1, wherein the latch is a set-reset latch.

9. A method of operating an image sensor, comprising:
with a dual conversion gain image pixel, accumulating charge;
with the dual conversion gain image pixel, outputting a voltage onto a corresponding column line; and
with an anti-eclipse circuit, comparing the output voltage to a reference bias voltage and selectively providing current to the dual conversion gain image pixel to charge up a floating diffusion node of the dual conversion gain image pixel in response to the output voltage falling below the reference bias voltage during eclipse conditions.

10. The method of claim 9, wherein comparing the output voltage to the reference bias voltage comprises using a differential comparator to compare the output voltage to the reference bias voltage.

11. The method of claim 10, further comprising:
with a latch in the anti-eclipse circuit, receiving first comparator output signals from the differential comparator.

12. The method of claim 11, further comprising:
with a first switch in the anti-eclipse circuit, receiving latch signals from the latch.

13. The method of claim 12, further comprising:
with a second switch in the anti-eclipse circuit, receiving second comparator output signals from the differential comparator, wherein only one of the first and second switches is turned on at any given point in time.

14. The method of claim 13, wherein selectively providing current to the dual conversion gain image pixel comprises using the second switch to pass current from a current source in the anti-eclipse circuit directly to the dual conversion gain image pixel.

15. The method of claim 14, wherein the dual conversion gain image pixel comprises a dual conversion gain capacitor, and wherein selectively providing current to the dual conversion gain image pixel comprises using the current source to charge a bottom plate of the dual conversion gain capacitor.

16. The method of claim 9, wherein comparing the output voltage to the reference bias voltage comprises using a comparator to compare the output voltage to the reference bias voltage and to output a corresponding control signal, and wherein selectively providing current to the dual conversion gain image pixel comprises using the control signal output by the comparator to control a switch that provides the current to the dual conversion gain image pixel.

17. An image sensor, comprising:
a pixel operable in multiple gain modes, wherein the pixel comprises:
a floating diffusion node;
a reset transistor directly connected to a positive power supply terminal; and
a capacitor having a top plate and a bottom plate, wherein the top plate of the capacitor is coupled to the floating diffusion node; and
an anti-eclipse circuit configured to selectively charge the bottom plate of the capacitor while the reset transistor receives a power supply voltage from the positive power supply terminal, wherein the anti-eclipse circuit comprises a comparator.

18. The image sensor of claim 17, wherein the anti-eclipse circuit further comprises a latch.

19. The image sensor of claim 17, wherein the anti-eclipse circuit further comprises a current source configured to charge the bottom plate of the capacitor.

20. The image sensor of claim 19, wherein the comparator has a first input configured to receive signals from the pixel, a second input configured to receive a reference voltage, a first output, and a second output, and wherein the anti-eclipse circuit further comprises:
a latch configured to receive signals from the first output of the comparator;
a first switch configured to receive signals from the latch; and
a second switch configured to receive signals form the second output of the comparator, wherein the current source, the first switch, and the second switch are coupled in series.

* * * * *